US010591686B2

(12) United States Patent
Kon

(10) Patent No.: US 10,591,686 B2
(45) Date of Patent: *Mar. 17, 2020

(54) OPTICAL RECEPTACLE AND OPTICAL MODULE

(71) Applicant: Enplas Corporation, Saitama (JP)

(72) Inventor: Ayano Kon, Saitama (JP)

(73) Assignee: ENPLAS CORPORATION, Saitama (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/082,996

(22) PCT Filed: Feb. 20, 2017

(86) PCT No.: PCT/JP2017/006136
§ 371 (c)(1),
(2) Date: Sep. 7, 2018

(87) PCT Pub. No.: WO2017/154540
PCT Pub. Date: Sep. 14, 2017

(65) Prior Publication Data

US 2019/0101712 A1 Apr. 4, 2019

(30) Foreign Application Priority Data

Mar. 7, 2016 (JP) ................................ 2016-043297

(51) Int. Cl.
*G02B 6/42* (2006.01)
*G02B 6/28* (2006.01)

(52) U.S. Cl.
CPC ......... *G02B 6/4212* (2013.01); *G02B 6/4246* (2013.01); *G02B 6/4286* (2013.01); *G02B 6/4298* (2013.01); *G02B 6/2817* (2013.01); *G02B 6/4214* (2013.01); *G02B 6/4221* (2013.01)

(58) Field of Classification Search
USPC ...................................................... 385/31–33
See application file for complete search history.

(56) References Cited

U.S. PATENT DOCUMENTS

2015/0030285 A1 1/2015 Tanazawa

FOREIGN PATENT DOCUMENTS

| | | |
|---|---|---|
| JP | 07-244230 A | 9/1995 |
| JP | 2015-022267 A | 2/2015 |
| WO | 2014030563 A1 | 2/2014 |
| WO | 2016/031603 A1 | 3/2016 |

OTHER PUBLICATIONS

International Search Report from International Application No. PCT/JP2017/006136 dated Apr. 11, 2017.

*Primary Examiner* — Eric Wong
(74) *Attorney, Agent, or Firm* — Brundidge & Stanger, P.C.

(57) ABSTRACT

An optical receptacle having a first optical receptacle for transmission and a second optical receptacle for reception. The first optical receptacle has a first engaging section and the second optical receptacle has a second engaging section that engages with the first engaging section. A first recessed section and a second recessed section that open externally are formed in the first optical receptacle. A third recessed section that opens externally is formed in the second optical receptacle. Part of each of the inner surfaces of the first recessed section, the second recessed section, and the third recessed section is a reflective surface.

6 Claims, 10 Drawing Sheets

OPTICAL RECEPTACLE AND OPTICAL MODULE

TECHNICAL FIELD

The present invention relates to an optical receptacle, and an optical module including the optical receptacle.

BACKGROUND ART

In the related art, an optical module including a photoelectric conversion element (light-emitting element, light-receiving element or both) is used in optical communications using an optical transmission member such as an optical fiber and a light waveguide. In an optical module, an optical receptacle that is disposed between a photoelectric conversion element and an optical transmission member and is configured to optically couple the photoelectric conversion element and an end surface the optical transmission member is used. Optical modules are classified into a transmitting optical module having a transmitting capability and a receiving optical module having a receiving capability, and a transmitting and receiving optical module having both a transmitting capability and a receiving capability.

For example, as an optical module for transmission, an optical module that is intended to adjust the optical output or stabilize the output performance of a light emitting element against temperature variation, and includes a detection element for checking (monitoring) the intensity and the quantity of the emission light emitted from the light emitting element is known (see, for example, PTL 1).

FIG. 1 schematically illustrates a configuration of optical module 10 disclosed in PTL 1. In FIG. 1, the hatching on the cross-section of optical receptacle 30 is omitted to illustrate light paths in optical receptacle 30.

As illustrated in FIG. 1, optical module 10 disclosed in PTL 1 includes photoelectric conversion device 20 and optical receptacle 30. Optical receptacle 30 includes first optical surface 31 that allows incidence of emission light L emitted from light-emitting element 21, reflection surface 32 that reflects emission light L having entered optical receptacle 30 from first optical surface 31 toward optical transmission member 40 side, light separation part 33 that separates emission light L reflected by reflection surface 32 into monitor light Lm travelling toward detection element 22 side and signal light Ls travelling toward optical transmission member 40 side, transmission surface 34 that allows signal light Ls emitted out of optical receptacle 30 by light separation part 33 to reenter optical receptacle 30, second optical surface 35 that emits signal light Ls having entered optical receptacle 30 from transmission surface 34 such that the light is condensed at the end surface of optical transmission member 40, and third optical surface 36 that emits monitor light Lm toward detection element 22.

Reflection surface 32 is a part of the inner surface of first recess 37 formed in the top surface of optical receptacle 30. In addition, light separation part 33 is a part of the inner surface of second recess 38 formed in the top surface of optical receptacle 30.

CITATION LIST

Patent Literature

PTL 1

Japanese Patent Application Laid-Open No. 2015-022267

SUMMARY OF INVENTION

Technical Problem

In the optical module disclosed in PTL 1, light-emitting element 21 and the end surface of optical transmission member 40 can be coupled to each other while monitoring the output characteristics of light-emitting element 21 with detection device 22. In the receiving optical module, however, the monitoring of the output characteristics of light-emitting element 21 is unnecessary, and therefore detection device 22 and light separation part 33 of optical receptacle 30 are not essential. As such, in the optical receptacle used for the transmitting and receiving optical module, the shape of the portion that functions as the transmitting optical module and the shape of the portion that functions as the receiving optical module might be different from each other in some situation.

FIGS. 2A to 2C illustrate an example of a configuration of optical receptacle 30' used for a transmitting and receiving optical module, and FIGS. 2D to 2F show a simulation result of positions where weld lines can be formed in manufacture of optical receptacle 30' by injection molding. It is to be noted that FIG. 2A is a plan view of transmitting and receiving optical receptacle 30', FIG. 2B is a bottom view of optical receptacle 30', and FIG. 2C is a sectional view taken along line C-C of FIG. 2B. In addition, FIG. 2D shows a simulation result with transmitting and receiving optical receptacle 30' in plan view, FIG. 2E shows a simulation result with receiving optical receptacle 30' in bottom view, and FIG. 2F shows a simulation result with a cross section taken along line F-F of FIG. 2E.

It is to be noted that in the simulation with optical receptacle 30', it is assumed that molten resin is injected into the cavity of the metal mold from a gate disposed on the right side surface side of optical receptacle 30' (see FIG. 2D). In FIG. 2D, the arrow direction indicates the flow direction of the resin in the cavity in manufacture of optical receptacle 30', and the blacked out portion indicates generation of a weld line.

As illustrated in FIGS. 2A to 2C, transmitting and receiving optical receptacle 30' includes transmitting portion 301' that functions as a transmitting optical module and receiving portion 302' that functions as a receiving optical module. Transmitting portion 301' includes first recess 37' whose inner surface partially functions as a reflection surface (the above-described reflection surface 32), and second recess 38' whose inner surface partially functions as a reflection surface (the above-described light separation part 33). Receiving portion 302' includes third recess 39' whose inner surface partially functions as a reflection surface. In optical receptacle 30', transmitting portion 301' and receiving portion 302' are integrally molded by injection molding.

In manufacture of optical receptacle 30' by injection molding, molten resin injected into the cavity of the metal mold is divided to turn around third recess 303' formed in receiving portion 302' as illustrated in FIG. 2D. Next, the divided molten resin is further divided to turn around second recess 38' and first recess 37' formed in transmitting portion 31'. At this time, a part of the divided molten resin join together in the region of the light path between first recess 37' (reflection surface 32) and second recess 38' (light separation part 33). As a result, in this region, a weld line is generated as illustrated in FIG. 2F. The region where the weld line is generated is located on the light path of optical receptacle 30' (transmitting portion 301') (compare FIG. 1 with FIG. 2F). As a result, the weld line might affect light advancement in optical receptacle 30', and the photoelectric conversion element (light-emitting element) and the end surface of the optical transmission member might not be appropriately coupled with each other in some situation.

An object of the present invention is to provide an optical receptacle which can suppress generation of a weld line on the light path even when the optical receptacle includes a transmitting portion and a receiving portion having different shapes. In addition, another object of the present invention is to provide an optical module including the above-mentioned optical receptacle.

Solution to Problem

An optical receptacle according an embodiment of to the present invention is configured to be disposed between a photoelectric conversion device and a plurality of optical transmission members, the photoelectric conversion device including a light-emitting element, a light-receiving element and a detection device for monitoring emission light emitted from the light-emitting element which are disposed on a substrate, the optical receptacle being configured to optically couple the light-emitting element and the light-receiving element to respective end surfaces of the plurality of optical transmission members, the optical receptacle including: a first optical receptacle for transmission including a first surface, a second surface opposite to the substrate, a third surface opposite to the second surface and a first fitting part disposed on the first surface, the first optical receptacle being disposed on the substrate in such a manner that the first optical receptacle is opposite to the light-emitting element and the detection device; and a second optical receptacle for reception including a fourth surface, a fifth surface opposite to the substrate, a sixth surface opposite to the fifth surface and a second fitting part disposed on the fourth surface, the second fitting part being configured to be fit to the first fitting part, the second optical receptacle being disposed on the substrate in such a manner that the second optical receptacle is opposite to the light-receiving element. The first optical receptacle includes a first recess and a second recess opening outward, the first recess and the second recess being formed in the third surface. The second optical receptacle includes a third recess opening outward, the third recess being formed in the sixth surface. A part of an inner surface of each of the first recess, the second recess and the third recess is a reflection surface.

An optical module according an embodiment of to the present invention includes: a photoelectric conversion device including a substrate, a light-emitting element disposed on the substrate, a light-receiving element disposed on the substrate, and a detection device disposed on the substrate, the detection device being configured to monitor emission light emitted from the light-emitting element; and the optical receptacle. The first optical receptacle is disposed on the substrate in such a manner that the first optical receptacle is opposite to the light-emitting element and the detection device, the second optical receptacle is disposed on the substrate in such a manner that the second optical receptacle is opposite to the light-receiving element, and the first optical receptacle and the second optical receptacle are coupled with each other by fitting the first fitting part and the second fitting part to each other.

Advantageous Effects of Invention

According to the present invention, the transmitting portion and the receiving portion of the optical receptacle are separately manufactured, and it is thus possible to suppress generation of a weld line on the light path even when the optical receptacle includes a transmitting portion and a receiving portion having different shapes.

DESCRIPTION OF EMBODIMENT

An embodiment of the present invention is elaborated below with reference to the accompanying drawings.

Configuration of Optical Module

Figure 1:
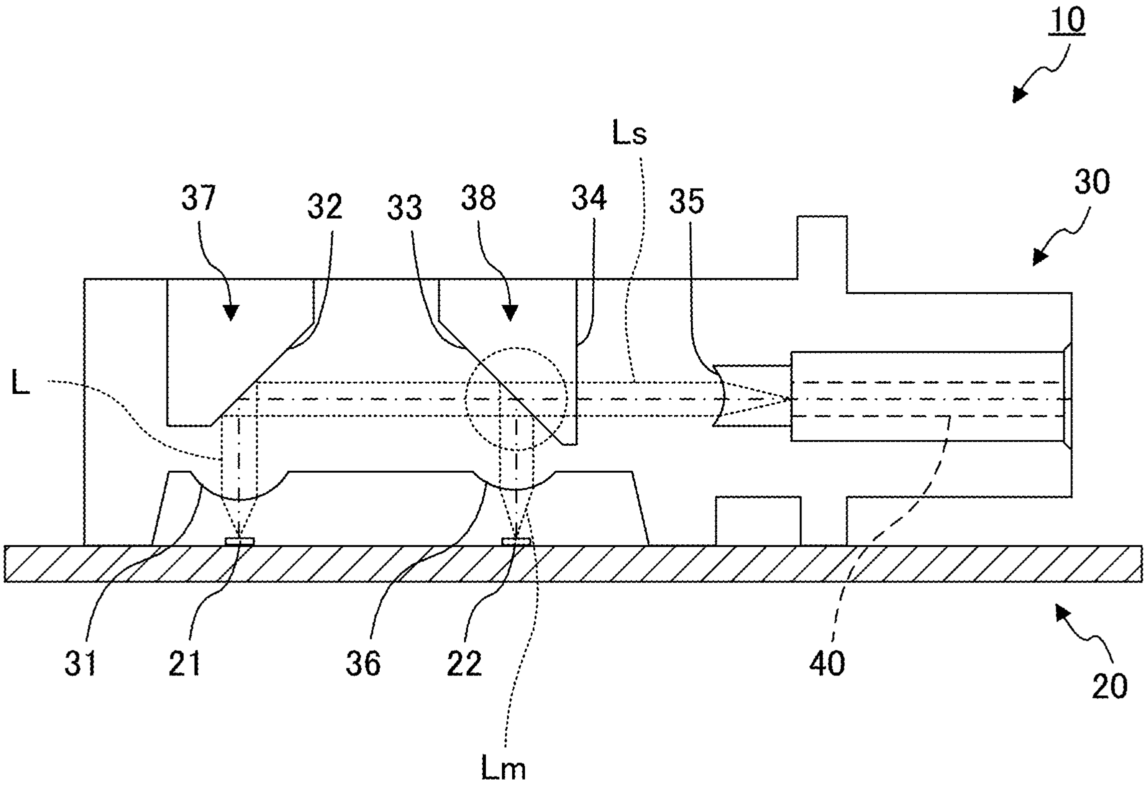
FIG. 1 illustrates a configuration of the optical module disclosed in PTL 1.
Figure 2A:
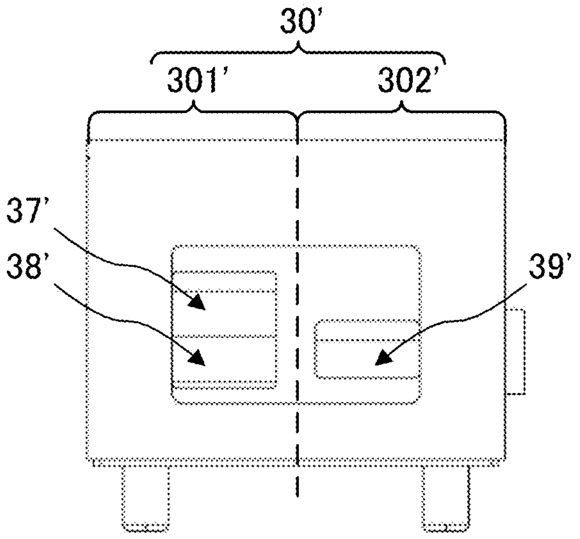
FIGS. 2A to 2C illustrate an example of a configuration of an optical receptacle used for a transmitting and receiving optical module.
Figure 2D:
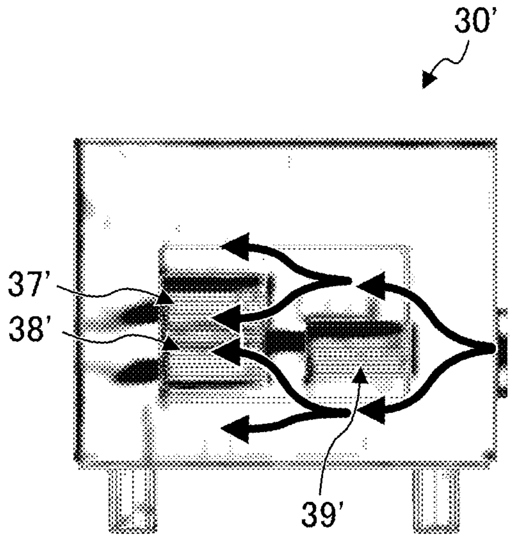
FIGS. 2D to 2F show a simulation result of positions where a weld line can be formed in manufacture of the optical receptacle by injection molding.
Figure 2B:
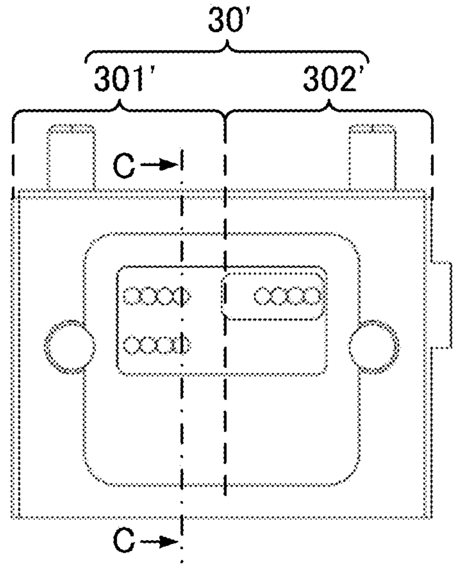
Figure 2E:
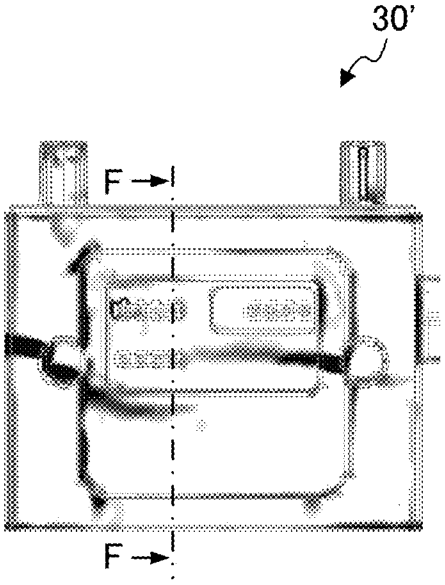
Figure 2C:
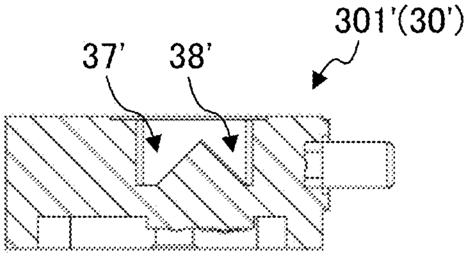
Figure 2F:
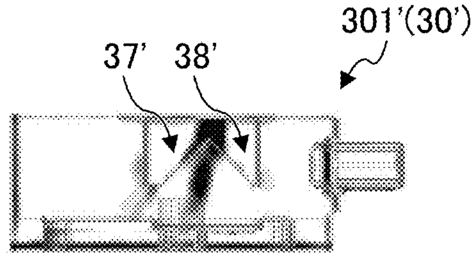
Figure 3A:
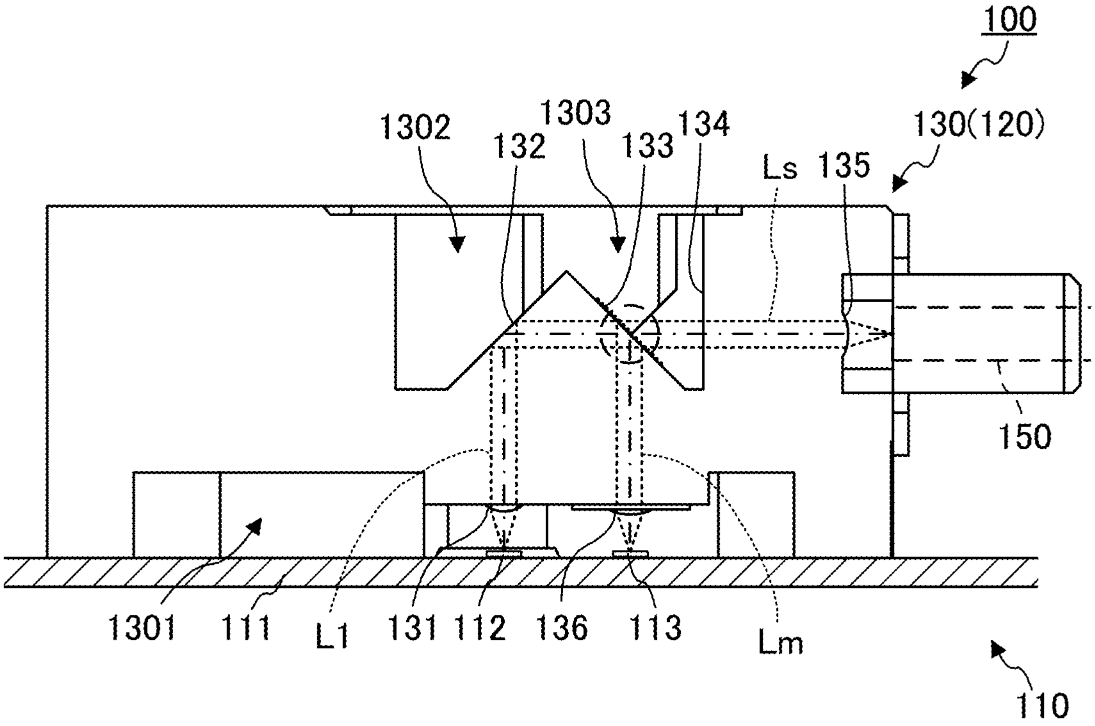
FIGS. 3A and 3B schematically illustrate a configuration of an optical module according to an embodiment.
Figure 3B:
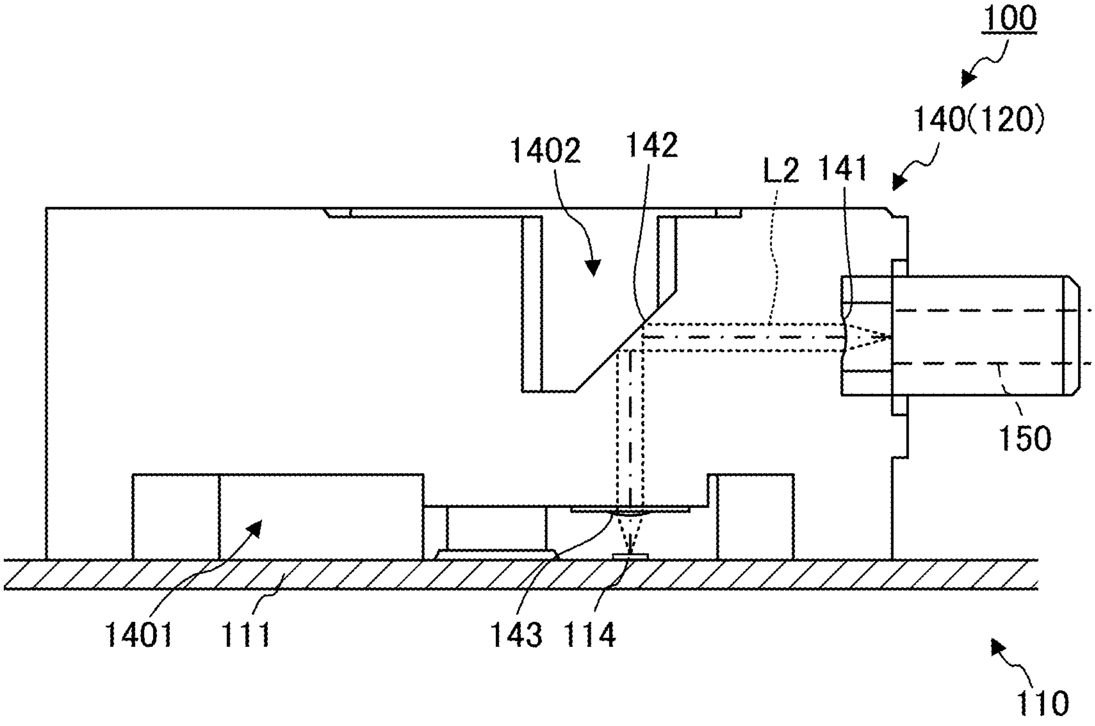

FIGS. 3A and 3B are sectional views schematically illustrating a configuration of optical module 100 according to Embodiment 1 of the present invention. FIG. 3A is a sectional view taken along line A-A of FIG. 4B described later, and FIG. 3B is a sectional view taken along line B-B of FIG. 4B described later. In FIGS. 3A and 3B, the hatching on the cross-section of optical receptacle 120 is omitted to illustrate light paths in optical receptacle 120. In addition, in FIGS. 3A and 3B, the dashed line indicates the optical axis, and the broken line indicates a light outer diameter.

As illustrated in FIG. 3A and FIG. 3B, optical module 100 includes photoelectric conversion device 110 and optical receptacle 120. Optical module 100 according to the present embodiment is a transmitting and receiving optical module. FIG. 3A illustrates a portion that functions as a transmitting optical module, and FIG. 3B illustrates a portion that functions as a receiving optical module. Optical module 100 is used with optical transmission member 150 and optical receptacle 120 connected with each other.

Photoelectric conversion device 110 includes substrate 111, light-emitting element 112, detection device 113, light-receiving element 114 and a control part (not illustrated in the drawing).

Substrate 111 holds light-emitting element 112, detection device 113, light-receiving element 114, the control part and optical receptacle 120. Substrate 111 is, for example, a glass composite substrate, a glass epoxy substrate, a flexible substrate or the like.

Light-emitting element 112 is disposed on substrate 111. Light-emitting element 112 is disposed in the portion that functions as the transmitting optical module. The number and the position of light-emitting element 112 are not limited, and may be appropriately set in accordance with the use. In the present embodiment, four light-emitting elements are arranged on one straight line along the depth direction in FIGS. 3A and 3B.

The light-emitting element emits laser light in a direction perpendicular to the top surface of substrate 111. To be more specific, the light-emitting element emits laser light from a light-emitting surface (light emission region). The number and the position of the light-emitting element are not limited. The light-emitting element is, for example, a vertical cavity surface emitting laser (VCSEL).

Detection device 113, which is disposed on substrate 111, monitors first emission light L1 emitted from the light-emitting surface (light emission region) of light-emitting element 112. To be more specific, detection device 113 receives monitor light Lm, which is a part of the first emission light emitted from optical receptacle 120. Detection device 113 is a photodiode (PD), for example.

The number of detection device 113 is not limited, and may be appropriately set in accordance with the use. In the present embodiment, four detection devices 113 are provided as with the light-emitting elements. Four detection devices 113 are disposed on substrate 111 at a position where monitor light Lm can be received. In addition, in view of preventing reflection light from detection element 113 from returning to optical receptacle 120 (first optical receptacle 130 described later), the optical axis of monitor light Lm incident on detection element 113 may be tilted with respect to the detection surface of detection element 113.

Light-receiving element 114 is disposed on substrate 111. Light-receiving element 114 is disposed in the portion that functions as the receiving optical module. The number and the position of light-receiving element 114 are not limited, and may be appropriately set in accordance with the use. In the present embodiment, four light-receiving elements 114 are arranged on one straight line along the depth direction in FIGS. 3A and 3B.

Light-receiving element 114 receives light (second emission light L2 described later) that has been emitted from the end surface of optical transmission member 150 and has passed inside optical receptacle 120 (second optical receptacle 140 described later). To be more specific, light-receiving element 114 receives second emission light L2 at light reception surface (light reception region). Light-receiving element 114 is a photodiode (PD), for example.

Although not illustrated in the drawings, the control part is disposed on substrate 111, and is electrically connected with light-emitting element 112 and detection device 113 through a wiring. On the basis of the intensity and/or the quantity of monitor light Lm received by detection device 113 and the like, the control part controls the output of first emission light L1 that is emitted by light-emitting element 112.

In the state where optical receptacle 120 is disposed between light-emitting element 112 and light-receiving element 114, and a plurality of optical transmission members 150, optical receptacle 120 optically couples light-emitting element 112 and light-receiving element 114 to respective end surfaces of optical transmission members 150. In the portion that functions as the transmitting optical module, optical receptacle 120 (first optical receptacle 130) emits, toward the end surface of optical transmission member 150, signal light Ls that is a part of first emission light L1 emitted from light-emitting element 112. In the portion that functions as the receiving optical module, optical receptacle 120 (second optical receptacle 140) emits, toward light-receiving element 114, second emission light L2 emitted from the end surface of optical transmission member 150.

Optical receptacle 120 is elaborated later, and light is denoted herein as follows. It is to be noted that FIG. 3A illustrates light (L1, Ls and Lm) passing through the portion that functions as the transmitting optical module, and FIG. 3B illustrates light (L2) passing through the portion that functions as the receiving optical module.

Here, light emitted from light-emitting element 112 is referred to as "first emission light L1." First emission light L1 is light in a range from a light-emitting surface of light-emitting element 112 to light separation part 133 described later. In addition, a part of first emission light L1 that is separated by light separation part 133 and emitted from optical receptacle 120 (first optical receptacle 130) toward the end surface of optical transmission member 150 is referred to as "signal light Ls." Signal light Ls is light in a region from light separation part 133 to the end surface of optical transmission member 150. In addition, another part of first emission light L1 that is separated from light separation part 133 and emitted from optical receptacle 120 (first optical receptacle 130) toward detection device 113 is referred to as "monitor light Lm." That is, monitor light Lm is light in a region from light separation part 133 to detection device 113. Further, light emitted from the end surface of optical transmission member 150 is referred to as "second emission light L2." Second emission light L2 is light in a region from the end surface of optical transmission member 150 to a light reception surface of light-receiving element 114. Second emission light L2 is also reception light emitted from another optical module.

Photoelectric conversion device 110 and optical receptacle 120 (first optical receptacle 130 and second optical receptacle 140) are fixed to each other with a publicly known fixing member such as an adhesive agent (e.g. heat/ultraviolet curing resin).

Optical transmission member 150 is fixed on optical receptacle 120 with a publicly known attaching means in the state where optical transmission member 150 is housed in a multicore collective connector. The type of optical transmission member 150 is not limited. Examples of the type of optical transmission member 150 include an optical fiber, a light waveguide, and the like. In the present embodiment, optical transmission member 150 is an optical fiber. In addition, the optical fiber may be of a single mode type, or a multiple mode type. The number of optical transmission member 150 is not limited, and may be appropriately changed in accordance with the use. In the present embodiment, eight optical transmission members 150 are provided. Of the eight optical transmission members 150, four optical transmission members 150 are disposed in the portion that functions as the transmitting optical module, and the other four optical transmission members 150 are disposed in the portion that functions as the receiving optical module in optical module 100.

Configuration of Optical Receptacle

Figure 4A:
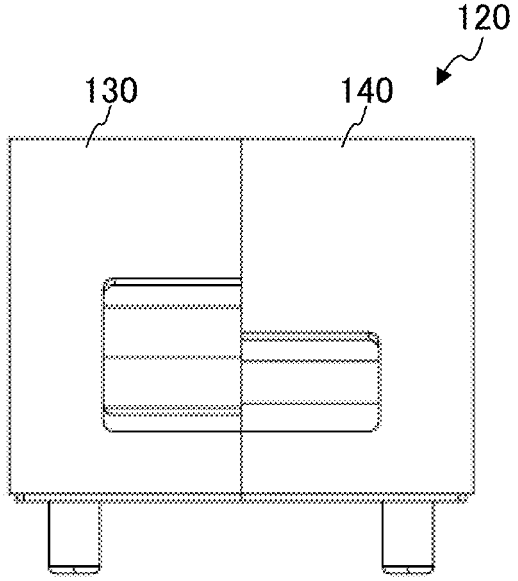
FIGS. 4A to 4F illustrate a configuration of an optical receptacle according to an embodiment.
Figure 4B:
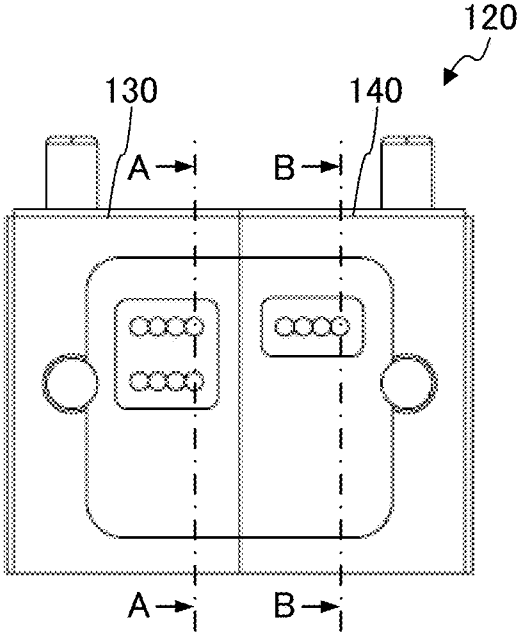
Figure 4C:
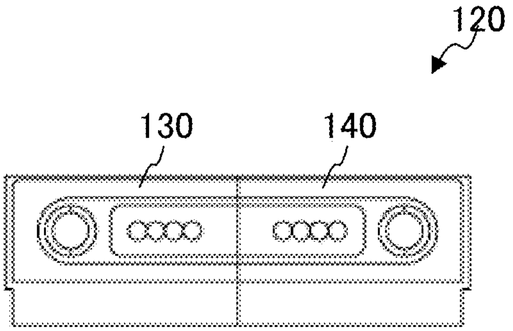
Figure 4D:
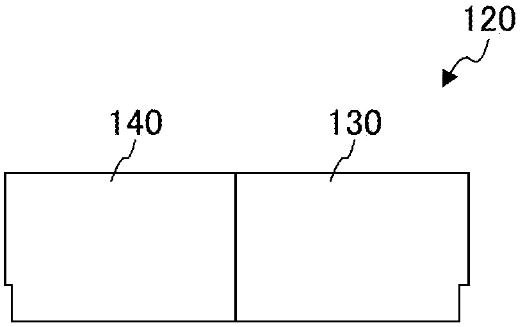
Figure 4E:
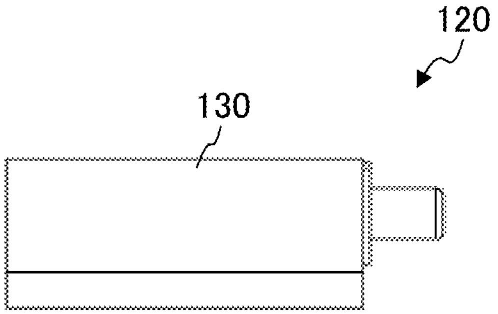
Figure 4F:
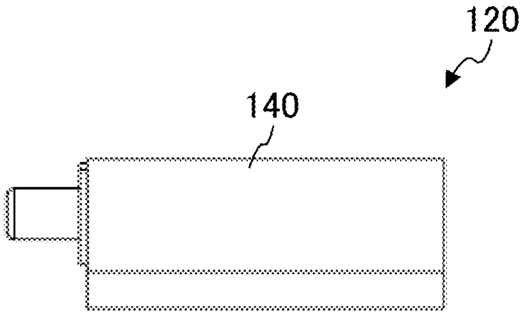

FIGS. 4A to 4F illustrate a configuration of optical receptacle 120 according to the present embodiment. FIG. 4A is a plan view of optical receptacle 120, FIG. 4B is a bottom view of optical receptacle 120, FIG. 4C is a front view of optical receptacle 120, FIG. 4D is a rear view of optical receptacle 120, FIG. 4E is a left side view of optical receptacle 120, and FIG. 4F is a right side view of optical receptacle 120. It is to be noted that, in the following description, the surface of optical receptacle 120 on which optical transmission member 150 is connected is referred to as "front surface."

As illustrated in FIGS. 4A to 4D, optical receptacle 120 includes first optical receptacle 130 for transmission, and second optical receptacle 140 for reception. As illustrated in FIG. 3A, first optical receptacle 130 is disposed on substrate 111 so as to be opposite to light-emitting element 112 and detection device 113. As illustrated in FIG. 3B, second optical receptacle 140 is disposed on substrate 111 so as to be opposite to light-receiving element 114. First optical receptacle 130 and second optical receptacle 140 are coupled with each other by fitting first fitting part 137 and second fitting part 144, which are described later, to each other.

First optical receptacle 130 and second optical receptacle 140 are formed with a material having a transparency to light of the wavelength used in optical communications. Examples of such a material include transparent resins such as polyetherimide (PEI) and cyclic olefin resin. In the case where first optical receptacle 130 and second optical receptacle 140 are composed of a resin composition as described above, it is preferable that the base resins of first optical receptacle 130 and second optical receptacle 140 be identical to each other. With such a configuration, the linear expansion coefficients of first optical receptacle 130 and second optical receptacle 140 are set to an identical value, and reduction in shape precision can be suppressed even in the case where optical module 100 is used under a high temperature.

In addition, a light attenuator for attenuating the intensity of light (first emission light L1, monitor light Lm and signal light Ls) passing through the inside of first optical receptacle 130 may be added in the resin composition of first optical receptacle 130 for transmission in view of safety in operation of optical module 100. Examples of the light attenuator include inorganic particles (such as carbon black and oxidation copper) and organic coloring matter (phthalocyanine coloring matter). In addition, a light attenuation film may be disposed on the surface of first optical receptacle 130 for transmission. The light attenuation film may be disposed on the entire surface of first optical receptacle 130, or only on the optical surface. The way of disposing the light attenuation film on the surface of first optical receptacle 130 may be, but not limited to, applying a light attenuation coating to the surface of first optical receptacle 130, for example. Examples of the material of the light attenuation film include Cr, Ni alloy and $TiO_2$.

In addition, it is preferable to dispose an anti-reflection film on the surface of second optical receptacle 140 for reception in view of reducing light reflection at the surface. The anti-reflection film may be disposed on the entire surface of second optical receptacle 140, or only on the optical surface. The way of disposing the anti-reflection film on the surface of second optical receptacle 140 may be, but not limited to, applying an anti-reflection coating (AR coating) on the surface of second optical receptacle 140, for example. Examples of the material of the anti-reflection film include $SiO_2$, $TiO_2$ and $MgF_2$.

Configuration of First Optical Receptacle

Figure 5A:
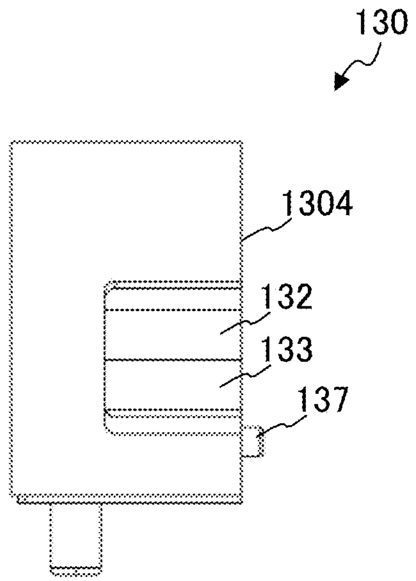
FIGS. 5A to 5F illustrate a configuration of a first optical receptacle according to the embodiment.
Figure 5B:
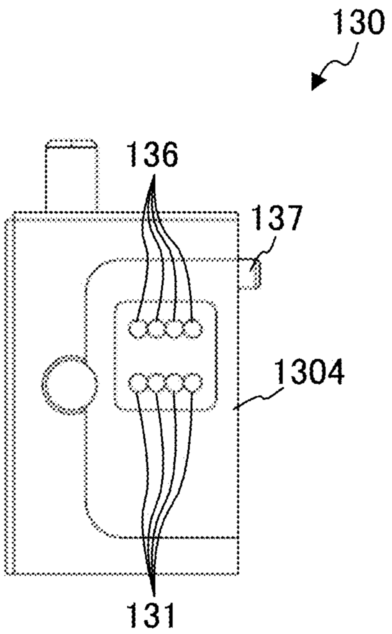
Figure 5C:
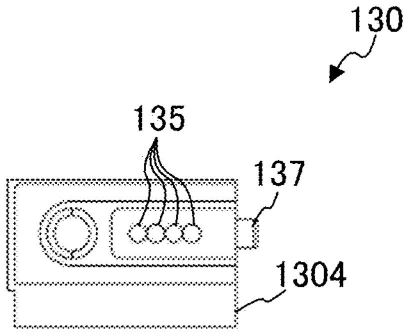
Figure 5D:
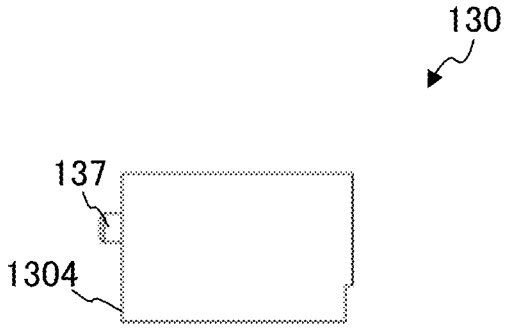
Figure 5E:
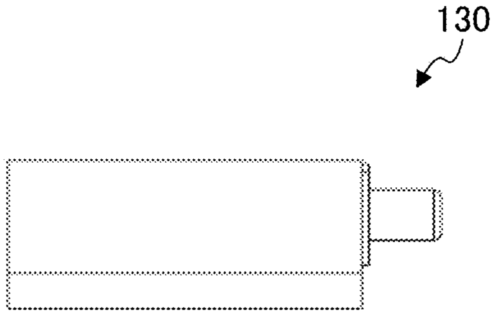
Figure 5F:
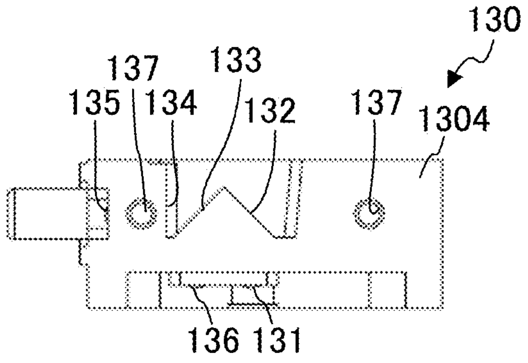

FIGS. 5A to 5F illustrate a configuration of first optical receptacle 130 according to the present embodiment. FIG. 5A is a plan view of first optical receptacle 130, FIG. 5B is a bottom view of first optical receptacle 130, FIG. 5C is a front view of first optical receptacle 130, FIG. 5D is a rear view of first optical receptacle 130, FIG. 5E is a left side view of first optical receptacle 130, and FIG. 5F is a right side view of first optical receptacle 130.

As illustrated in FIG. 3A and FIGS. 5A to 5F, first optical receptacle 130 is a member having a substantially cuboid shape. In the present embodiment, first recess 1301 having a substantially rectangular prism shape and opening outward in the bottom surface is formed in the bottom surface of first optical receptacle 130. In the top surface (facing away from the surface (bottom surface) facing substrate 111) of first optical receptacle 130, second recess 1302 (referred to as "first recess" in the claims) having a substantially pentagonal prism shape, and third recess 1303 (referred to as "second recess" in the claims) having a substantially pentagonal prism shape are continuously formed in a direction from the back side to the front side of optical receptacle 120 so as to open outward in the top surface and the right side surface. As elaborated later, a part of the inner surface of second recess 1302 is first reflection surface 132, and a part of the inner surface of third recess 1303 is divided reflection surface 133*a* (see FIG. 6A described later). It is to be noted that, in the present embodiment, second recess 1302 and third recess 1303 communicate with each other.

First optical receptacle 130 includes first optical surface 131, first reflection surface 132, light separation part 133, transmission surface 134, second optical surface 135, third optical surface 136 and first fitting part 137.

First optical surface 131 allows, to enter first optical receptacle 130, first emission light L1 emitted from light-emitting element 112. At this time, first optical surface 131 allows, to enter first optical receptacle 130, first emission light L1 emitted from the light-emitting surface (light emission region) of light-emitting element 112 while refracting the light so as to convert the light into collimate light.

The number of first optical surface 131 is not limited, and may be appropriately selected in accordance with the use. In the present embodiment, four first optical surfaces 131 are provided. Four first optical surfaces 131 are respectively disposed so as to be opposite to four light-emitting elements 112 in the bottom surface of first optical receptacle 130.

The shape of first optical surface 131 may be, but not limited to, a plane shape or a curved shape. In the present embodiment, first optical surface 131 is a convex lens surface protruding toward light-emitting element 112. In addition, the shape of first optical surface 131 in plan view is a circular shape. Preferably, the central axis of first optical surface 131 is perpendicular to the light-emitting surface of light-emitting element 112 (and the top surface of substrate 111). In addition, preferably, the central axis of first optical surface 131 matches the optical axis of first emission light L1 emitted from light-emitting element 112.

First reflection surface 132 reflects, toward second optical surface 135 side, first emission light L1 having entered first optical receptacle 130 from first optical surface 131. First reflection surface 132 is a part of the inner surface of second recess 1302. First reflection surface 132 is tilted such that the distance thereof to second optical surface 135 (the front surface of first optical receptacle 130) decreases from the bottom surface toward the top surface of first optical receptacle 130. The inclination angle of first reflection surface 132 is not limited. In the present embodiment, the inclination angle of first reflection surface 132 is 45° with respect to the optical axis of light incident on first reflection surface 132 (first emission light L1). The shape of first reflection surface 132 may be, but not limited to, a plane shape, or a curved shape. In the present embodiment, first reflection surface 132 has a plane shape. The incident angle of light (first emission light L1) incident on first reflection surface 132 is greater than the critical angle.

Light separation part 133 separates first emission light L1, which has entered first optical receptacle 130 from first optical surface 131 and has been reflected by first reflection surface 132, into monitor light Lm travelling toward detection device 113 and signal light Ls travelling toward the end surface of optical transmission member 150. Light separation part 133 is disposed on the light path between first optical surface 131 and second optical surface 135. Light separation part 133 is a part of the inner surface of third recess 1303.

Figure 6A:
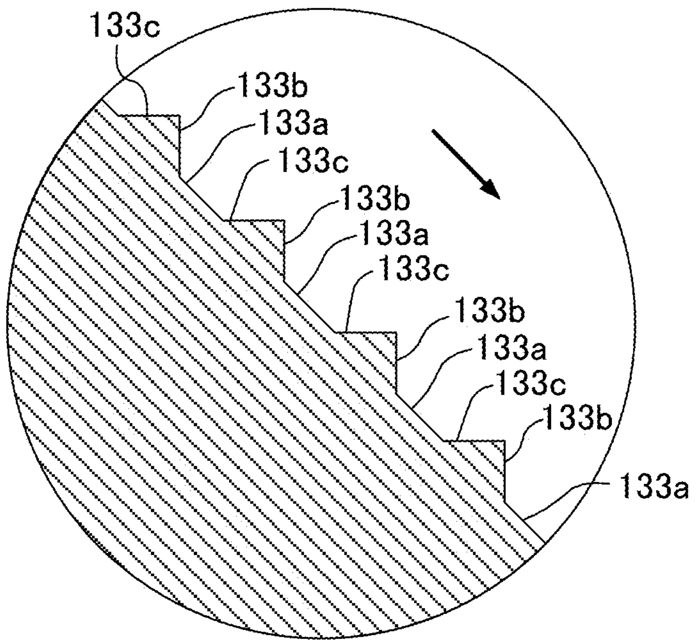
FIGS. 6A and 6B illustrate a configuration of a light separation part of the first optical receptacle according to the embodiment.
Figure 6B:
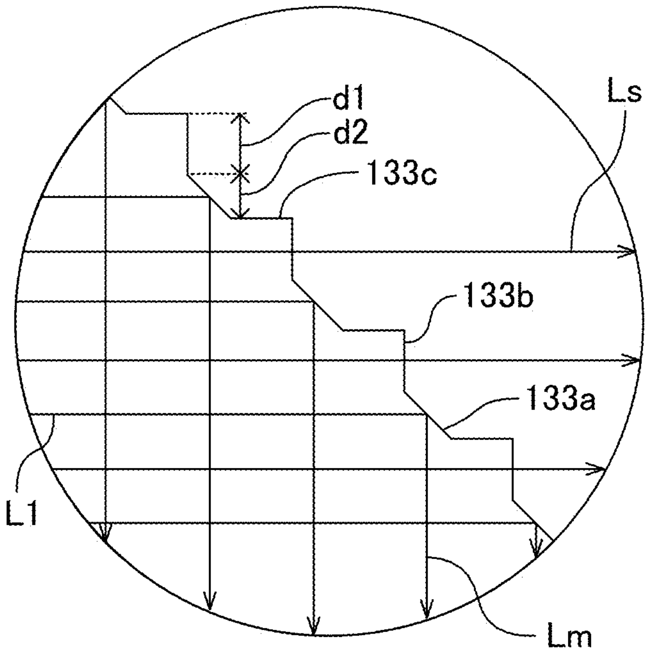

FIGS. 6A and 6B illustrate a configuration of light separation part 133 of first optical receptacle 130 according to the present embodiment. FIG. 6A is a partially enlarged sectional view of a region indicated with the broken line in FIG. 3A, and FIG. 6B is a partially enlarged sectional view illustrating light paths in first optical receptacle 130 in a region around light separation part 133. In FIG. 6B, the hatching on the cross-section of first optical receptacle 130 is omitted to illustrate light paths in first optical receptacle 130.

Light separation part 133 includes a plurality of divided reflection surfaces 133*a*, a plurality of divided transmission surfaces 133*b*, and a plurality of divided step surfaces 133*c*. Divided reflection surfaces 133*a* alternate with divided transmission surfaces 133*b* along the inclination direction of divided reflection surface 133*a* (see the arrow illustrated in FIG. 6A).

Divided reflection surface 133*a* internally reflects, toward third optical surface 136, a part of first emission light L1 as monitor light Lm. Divided reflection surface 133*a* is also a surface inclined to the optical axis of first emission light L1. In the present embodiment, divided reflection surface 133*a* is tilted such that the distance thereof to second optical surface 135 (the front surface of first optical receptacle 130) decreases from the top surface to the bottom surface of first optical receptacle 130. The inclination angle of divided reflection surface 133*a* is 45° with respect to the optical axis of first emission light L1. Divided reflection surfaces 133*a* are spaced in the inclination direction of divided reflection surfaces 133*a* at a predetermined interval. Divided reflection surfaces 133*a* are disposed on the same plane.

Divided transmission surface 133*b* allows, to pass therethrough toward second optical surface 135 side, a part (another part) of first emission light L1 as signal light Ls. Divided transmission surface 133*b* is perpendicular to the optical axis of first emission light L1. Divided transmission surfaces 133*b* are spaced in the inclination direction of divided reflection surface 133*a* at a predetermined interval. Divided transmission surfaces 133*b* are parallel to each other.

Divided step surface 133*c* is parallel to the optical axis of first emission light L1, and connects between divided reflection surface 133*a* and divided transmission surface 133*b*. Also, divided step surfaces 133*c* are disposed at a predetermined interval in the inclination direction of divided reflection surface 133*a*. Divided step surfaces 133*c* are parallel to each other.

As illustrated in FIG. 6A, divided reflection surface 133*a*, divided step surface 133*c* and divided transmission surface 133*b* are arranged in the named order along the direction from the top surface toward the bottom surface. The smaller angle between divided reflection surface 133*a* and divided transmission surface 133*b* is 135°. Also, the smaller angle between divided reflection surface 133*a* and divided step surface 133*c* is 135°.

Next, light separation at light separation part 133 is described.

As illustrated in FIG. 6B, a part of first emission light L1 reflected by first reflection surface 132 is internally incident on divided reflection surface 133*a* at an incident angle greater than the critical angle. Divided reflection surface 133*a* internally reflects, toward third optical surface 136 (detection device 113 side), a part of first emission light L1, thereby generating monitor light Lm. In addition, a remaining part of first emission light L1 is incident on divided transmission surface 133*b*. Divided transmission surface 133*b* allows the remaining part of first emission light L1 to pass therethrough, thereby generating signal light Ls directed toward second optical surface 135 (the end surface of optical transmission member 150). At this time, since divided transmission surface 133*b* is perpendicular to incident first emission light L1, divided transmission surface 133*b* does not refract signal light Ls. It is to be noted that, since divided step surface 133*c* is parallel to the incident direction of first emission light L1, first emission light L1 does not incident on divided step surface 133*c*.

The light quantity ratio between signal light Ls and monitor light Lm is not limited as long as monitor light Lm capable of monitoring the intensity and the quantity of first emission light L1 emitted from light emitting element 112, and signal light Ls of a desired quantity can be obtained. The light quantity ratio between signal light Ls and monitor light Lm is approximately equal to the area ratio between divided transmission surface 133*b* and divided reflection surface 133*a* in light separation part 133 viewed from first reflection surface 132 side. Accordingly, the light quantity ratio between signal light Ls and monitor light Lm can be adjusted by changing the area ratio (see d1 and d2 of FIG. 6B) between divided transmission surface 133*b* and divided reflection surface 133*a* in light separation part 133 viewed from first reflection surface 132 side. Preferably, the light quantity ratio of signal light Ls to monitor light Lm is 5:5 to 9:1, more preferably, 7:3. In the present embodiment, the ratio of signal light Ls to monitor light Lm is 8:2.

Transmission surface 134 allows, to reenter first optical receptacle 130, signal light Ls which has been separated by light separation part 133 and has been emitted out of first optical receptacle 130. Transmission surface 134 is a part of the inner surface of third recess 1303.

Preferably, transmission surface 134 is perpendicular to signal light Ls separated by light separation part 133. With such a configuration, it is possible to allow signal light Ls travelling toward the end surface of optical transmission member 150 to enter first optical receptacle 130 without refracting signal light Ls. In addition, transmission surface 134 may be tilted with respect to the optical axis of signal light Ls separated by light separation part 133. In this case, transmission surface 134 is tilted such that the distance thereof to second optical surface 135 decreases from the bottom surface toward the top surface of first optical receptacle 130. Preferably, the inclination angle of transmission surface 134 as a tilted surface is, but not limited to, an inclination angle corresponding to a releasing taper for releasing in injection molding.

Second optical surface 135 emits, toward the end surface of optical transmission member 150, signal light Ls that is a part of first emission light L1 having entered first optical receptacle 130 from first optical surface 131 and having passed through the inside of first optical receptacle 130. At this time, second optical surface 135 emits signal light Ls toward the end surface of optical transmission member 150 while converging signal light Ls.

The number of second optical surface 135 is not limited, and may be appropriately selected in accordance with the use. In the present embodiment, four second optical surfaces 135 are provided. In the front surface of first optical receptacle 130, four second optical surfaces 135 are disposed so as to be opposite to the end surfaces of respective optical transmission members 150.

The shape of second optical surface 135 may be, but not limited to, a plane shape or a curved shape. In the present embodiment, the shape of second optical surface 135 is a convex lens protruding toward the end surface of optical transmission member 150. In plan view, second optical surface 135 has a circular shape. Preferably, the central axis of second optical surface 135 is perpendicular to the end surface of optical transmission member 150.

Third optical surface 136 emits, toward detection device 113, monitor light Lm separated by light separation part 133. At this time, third optical surface 136 emits monitor light Lm toward detection device 113 while converging monitor light Lm.

The number of third optical surface 136 is not limited, and may be appropriately selected in accordance with the use. In the present embodiment, four third optical surfaces 136 are provided. On the bottom surface of first optical receptacle 130, four third optical surfaces 136 are respectively opposite to four detection devices 113.

The shape of third optical surface 136 may be, but not limited to, a plane shape or a curved shape. In the present embodiment, third optical surface 136 is a convex lens protruding toward detection device 113. As described above, in view of preventing reflection light from detection device 113 from returning into first optical receptacle 130, it is preferable that the central axis of third optical surface 136 be tilted with respect to the detection surface of detection device 113.

First fitting part 137 is fitted to second fitting part 144 described later. In this manner, first optical receptacle 130 and second optical receptacle 140 are positioned and coupled to each other. First fitting part 137 is disposed at a position opposite to second fitting part 144 (described later) in first side surface 1304 (in the present embodiment, the right side surface) that is not the surface (in the present embodiment, the bottom surface) opposite to substrate 111 in optical receptacle 130.

The arrangement, shape, size, and number of first fitting part 137 are not limited as long as first optical receptacle 130 and second optical receptacle 140 are appropriately coupled with each other, and the arrangement, shape, size, and number of first fitting part 137 correspond to those of second fitting part 144. One or more first fitting parts 137 are provided. Examples of the shape of first fitting part 137 include a recessed shape and a protruding shape. Examples of the shape of first fitting part 137 in plan view include a circular shape, an elliptical shape, a quadrangular shape and a polygonal shape. In the present embodiment, first fitting part 137 is a columnar-shaped protrusion disposed on the front surface side of first side surface 1304, and a columnar-shaped recess disposed on the back side of first side surface 1304.

Configuration of Second Optical Receptacle

Figure 7A:
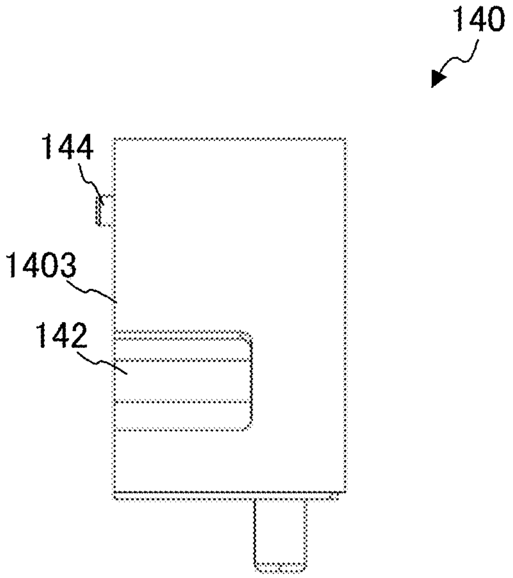
FIGS. 7A to 7F illustrate a configuration of a second optical receptacle according to the embodiment.
Figure 7B:
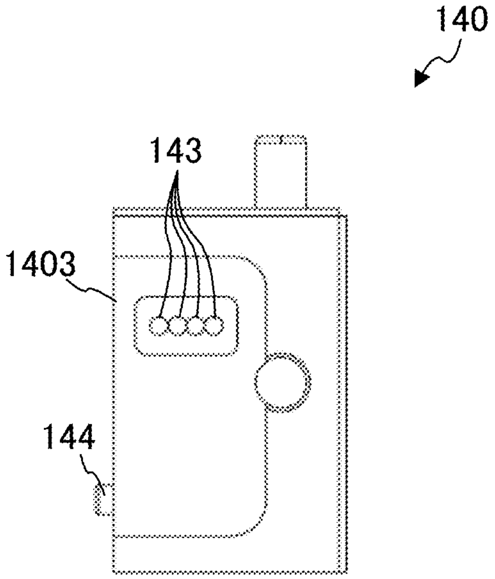
Figure 7C:
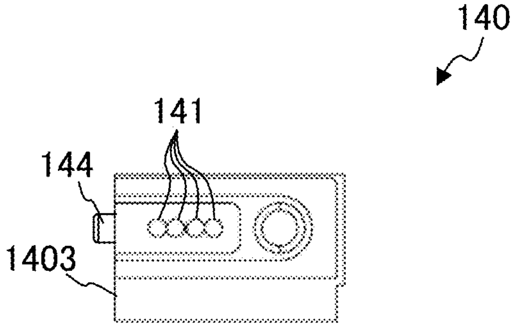
Figure 7D:
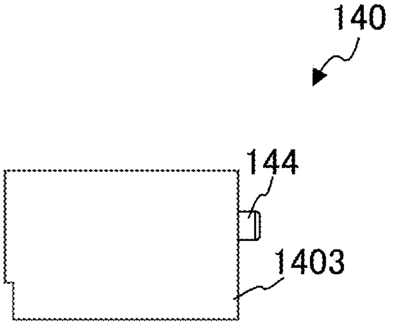
Figure 7E:
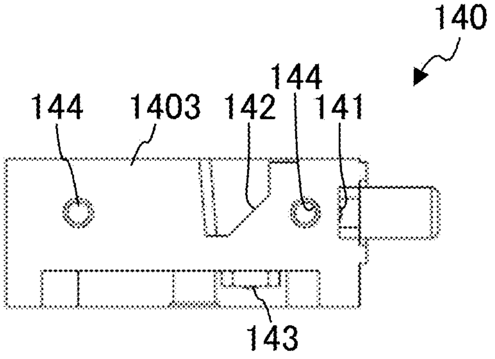
Figure 7F:
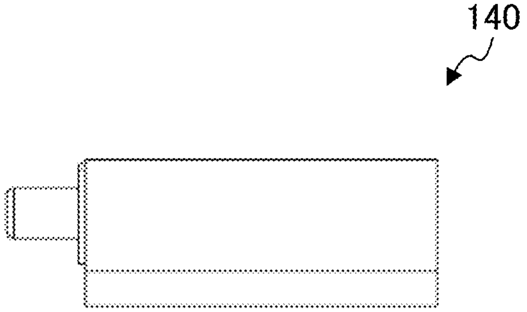

FIGS. 7A to 7F illustrate a configuration of second optical receptacle 140 according to the present embodiment. FIG. 7A is a plan view of second optical receptacle 140, FIG. 7B is a bottom view of second optical receptacle 140, FIG. 7C is a front view of second optical receptacle 140, FIG. 7D is a rear view of second optical receptacle 140, FIG. 7E is a left side view of second optical receptacle 140, and FIG. 7F is a right side view of second optical receptacle 140.

As illustrated in FIG. 3B and FIGS. 7A to 7F, second optical receptacle 140 is a member having a substantially cuboid shape. In the present embodiment, in the bottom surface of second optical receptacle 140, fourth recess 1401 having a substantially rectangular prism shape and opening outward in the bottom surface is formed. In the top surface (facing away from the surface (bottom surface) facing substrate 111) of second optical receptacle 140, fifth recess 1402 (referred to as "third recess" in the claims) having a substantially pentagonal prism shape and opening outward in the top surface and the left side surface is formed. As elaborated later, a part of the inner surface of fifth recess 1402 is second reflection surface 142.

Second optical receptacle 140 includes fourth optical surface 141, second reflection surface 142, fifth optical surface 143 and second fitting part 144.

Fourth optical surface 141 allows, to enter second optical receptacle 140, second emission light L2 emitted from the end surface of optical transmission member 150. At this time, fourth optical surface 141 allows, to enter second optical receptacle 140, second emission light L2 emitted from the end surface of optical transmission member 150 while refracting the second emission light L2, and thus converts the second emission light L2 into collimate light.

The number of fourth optical surface 141 is not limited, and may be appropriately selected in accordance with the use. In the present embodiment, four fourth optical surfaces 141 are provided. In the front surface of second optical receptacle 140, four fourth optical surfaces 141 are disposed so as to be opposite to the end surfaces of respective optical transmission members 150.

The shape of fourth optical surface 141 may be, but not limited to, a plane shape, or a curved shape. In the present embodiment, the shape of fourth optical surface 141 is a convex lens protruding toward the end surface of optical transmission member 150. Fourth optical surface 141 has a circular shape in plan view. Preferably, the central axis of fourth optical surface 141 is perpendicular to the end surface of optical transmission member 150. In addition, preferably, the central axis of fourth optical surface 141 matches the optical axis of second emission light L2 emitted from the end surface of optical transmission member 150.

Second reflection surface 142 reflects, toward fifth optical surface 143, second emission light L2 having entered second optical receptacle 140 from fourth optical surface 141. Second reflection surface 142 is a part of the inner surface of fifth recess 1402. Second reflection surface 142 is tilted such that the distance thereof to fourth optical surface 141 (the front surface of second optical receptacle 140) decreases from the bottom surface toward the top surface of second optical receptacle 140. The inclination angle of second reflection surface 142 is not limited. In the present embodiment, the inclination angle of second reflection surface 142 is 45° with respect to the optical axis of light incident on second reflection surface 142 (second emission light L2). The shape of second reflection surface 142 may be, but not limited to, a plane shape or a curved shape. In the present embodiment, second reflection surface 142 has a plane shape. The incident angle of light (second emission light L2) incident on second reflection surface 142 is greater than the critical angle.

Fifth optical surface 143 emits, toward light-receiving element 114, second emission light L2 that has entered second optical receptacle 140 from fourth optical surface 141 and has passed through the inside of second optical receptacle 140. At this time, fifth optical surface 143 emits second emission light L2 toward the light reception surface of light-receiving element 114 while converging second emission light L2.

The number of fifth optical surface 143 is not limited, and may be appropriately selected in accordance with the use. In the present embodiment, four fifth optical surfaces 143 are provided. In the bottom surface of second optical receptacle 140, four fifth optical surfaces 143 are respectively disposed so as to be opposite to four light-receiving elements 114.

The shape of fifth optical surface 143 may be, but not limited to, a plane shape or a curved shape. In the present embodiment, the shape of fifth optical surface 143 is a convex lens surface protruding toward light-receiving element 114. Fifth optical surface 143 has a circular shape in plan view. Preferably, the central axis of fifth optical surface 143 is perpendicular to light reception surface of light-receiving element 114 (and the top surface of substrate 111).

Second fitting part 144 is fitted to first fitting part 137. In this manner, first optical receptacle 130 and second optical receptacle 140 are positioned and coupled to each other. Second fitting part 144 is disposed at a position opposite to first fitting part 137 in second side surface 1403 (in the present embodiment, the left side surface) that is not the surface (in the present embodiment, the bottom surface) opposite to substrate 111 in second optical receptacle 140.

The arrangement, shape, size, and number of second fitting part 144 correspond to those of first fitting part 137, and are not limited as long as first optical receptacle 130 and second optical receptacle 140 are appropriately coupled with each other. One or more second fitting parts 144 are provided. Examples of the shape of second fitting part 144 include a recessed shape and a protruding shape. Examples of the shape of second fitting part 144 in plan view include a circular shape, an elliptical shape, a quadrangular shape and a polygonal shape. In the present embodiment, second fitting part 144 is a columnar-shaped recess disposed on the front surface side of second side surface 1403, and a columnar-shaped protrusion disposed on the back side of second side surface 1403.

Light Paths in Optical Module

Next, light paths in optical module 100 are described.

In first optical receptacle 130 that functions as the transmitting optical module, first emission light L1 emitted from light-emitting element 112 enters first optical receptacle 130 from first optical surface 131. At this time, first emission light L1 is converted to collimate light by first optical surface 131. Next, first emission light L1 having entered first optical receptacle 130 from first optical surface 131 is reflected by first reflection surface 132 toward light separation part 133. A part of first emission light L1 reaching light separation part 133 is internally reflected by divided reflection surface 133*a* toward third optical surface 136, and becomes monitor light Lm. Monitor light Lm is emitted out of first optical receptacle 130 from third optical surface 136, and reaches the detection surface of detection device 113. On the other hand, the remaining part of first emission light L1 reaching light separation part 133 passes through divided transmission surface 133*b* while being emitted out of first optical receptacle 130, and becomes signal light Ls. Next, signal light Ls reenters first optical receptacle 130 from transmission surface 134, and reaches second optical surface 135. Signal light Ls reaching second optical surface 135 is emitted out of first optical receptacle 130 from second optical surface 135, and reaches the end surface of optical transmission member 150.

On the other hand, in second optical receptacle 140 that functions as the receiving optical module, second emission light L2 emitted from the end surface of optical transmission member 150 enters second optical receptacle 140 from fourth optical surface 141. At this time, second emission light L2 is converted to collimate light by fourth optical surface 141. Next, second emission light L2 having entered second optical receptacle 140 from fourth optical surface 141 is reflected by second reflection surface 142 toward fifth optical surface 143. Next, second emission light L2 reaching fifth optical surface 143 is emitted out of second optical receptacle 140 from fifth optical surface 143, and reaches light-receiving element 114.

In the above-mentioned manner, optical receptacle 120 according to the present embodiment can optically couple light-emitting element 112 and light-receiving element 114 to the end surfaces of respective optical transmission members 150 in an appropriate manner.

Simulation

As described above, optical receptacle 120 (first optical receptacle 130 and second optical receptacle 140) can be manufactured by injection molding, for example. A weld line formed on light paths in the case where optical receptacle 120 is manufactured by injection molding affects advancement of light and is therefore not preferable. In view of this, positions where a weld line can be formed in manufacture of first optical receptacle 130 and second optical receptacle 140 by injection molding were simulated.

For comparison, simulation was conducted also with an integrally molded optical receptacle (hereinafter also referred to as "comparative optical receptacle") 120' instead of using separately molded first optical receptacle 130 and second optical receptacle 140. The configuration of comparative optical receptacle 120' is identical to that of optical receptacle 120 except that first optical receptacle 130 and second optical receptacle 140 are integrally molded. Therefore the components of comparative optical receptacle 120' are denoted with the reference numerals same as those of the present embodiment with "'" added thereto, and the description thereof will be omitted.

The simulation was conducted on the assumption of manufacture of first optical receptacle 130 of 1.8 (mm)×3.2 (mm)×6.0 (mm), second optical receptacle 140 of 1.8 (mm)×3.2 (mm)×6.0 (mm), and comparative optical receptacle 120' of 1.8 (mm)×6.4 (mm)×6.0 (mm). The simulation with comparative optical receptacle 120' was conducted on the assumption that a molten resin is injected into a cavity of a metal mold from a gate disposed on the right surface side of optical receptacle 120' (see FIG. 8D described later). In addition, the simulation with first optical receptacle 130 was conducted on the assumption that a molten resin is injected into a cavity of a metal mold from a gate disposed on the left surface side of first optical receptacle 130 (see FIG. 9A described later). Further, the simulation with second optical receptacle 140 was conducted on the assumption that a molten resin is injected into a cavity of a metal mold from a gate disposed on the right surface side of second optical receptacle 140 (see FIG. 9D described later). It is to be noted that the parameters were set using polyetherimide (PEI) as the material of each optical receptacle.

Figure 8A:
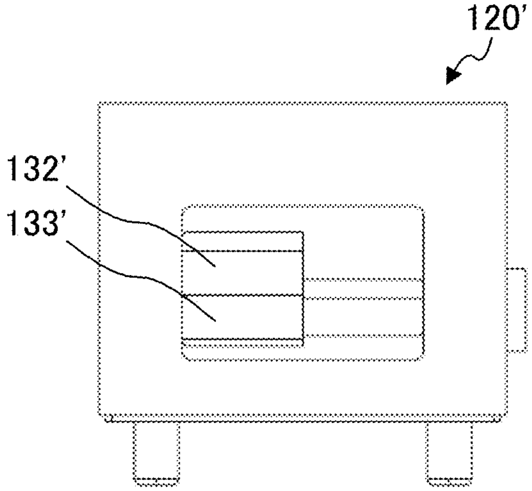
FIGS. 8A to 8C illustrate a configuration of a comparative optical receptacle.
Figure 8D:
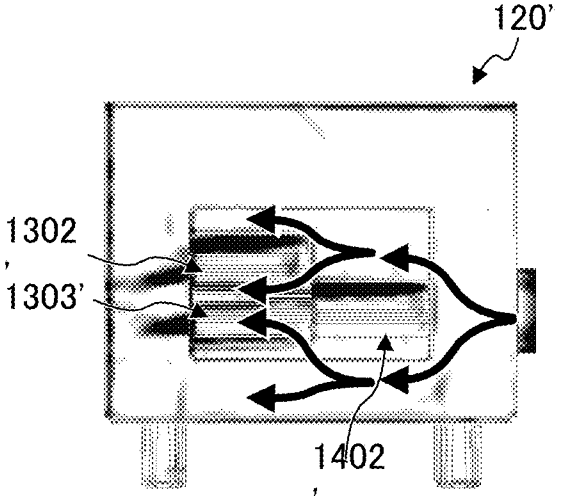
FIGS. 8D to 8F show a simulation result of positions where weld lines can be formed in manufacture of the comparative optical receptacle by injection molding.
Figure 8B:
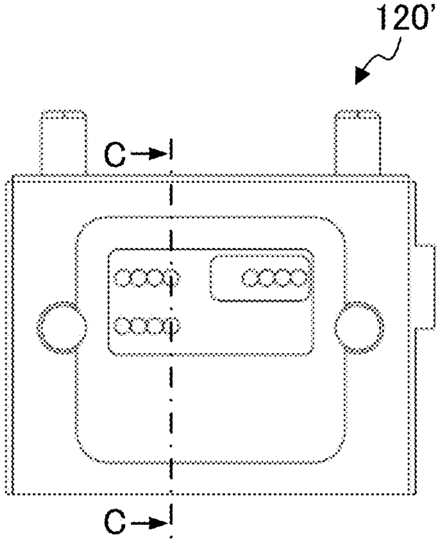
Figure 8E:
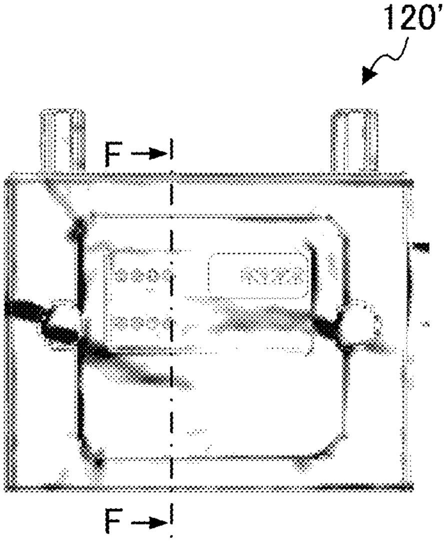
Figure 8C:
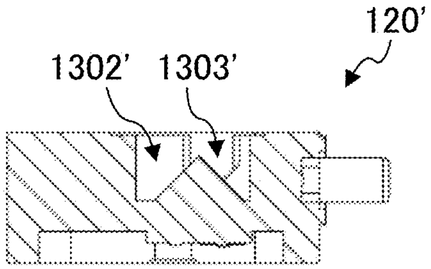
Figure 8F:
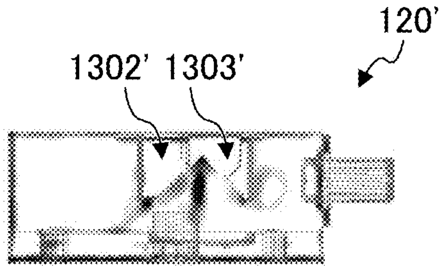

FIGS. 8A to 8C illustrate a configuration of comparative optical receptacle 120', and FIGS. 8D to 8F show a simulation result of positions where weld lines can be formed in manufacture of comparative optical receptacle 120' by injection molding. FIG. 8A is a plan view of comparative optical receptacle 120', FIG. 8B is a bottom view of comparative optical receptacle 120', and FIG. 8C is a sectional view taken along line C-C of FIG. 8B. In addition, FIG. 8D shows a simulation result of comparative optical receptacle 120' in plan view, FIG. 8E shows a simulation result with comparative optical receptacle 120' in bottom view, and FIG. 8F shows a simulation result with comparative optical receptacle 120' in a cross section taken along line F-F of FIG. 8E.

Figure 9A:
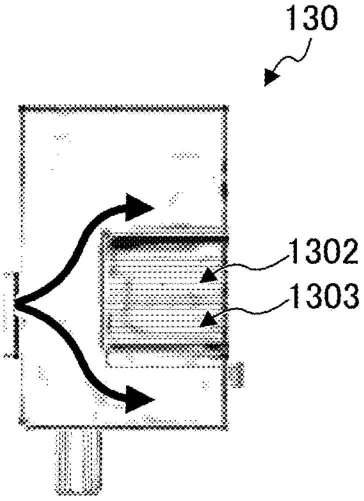
FIGS. 9A to 9C show a simulation result of positions where weld lines can be formed in manufacture of the first optical receptacle according to the embodiment by injection molding.
Figure 9D:
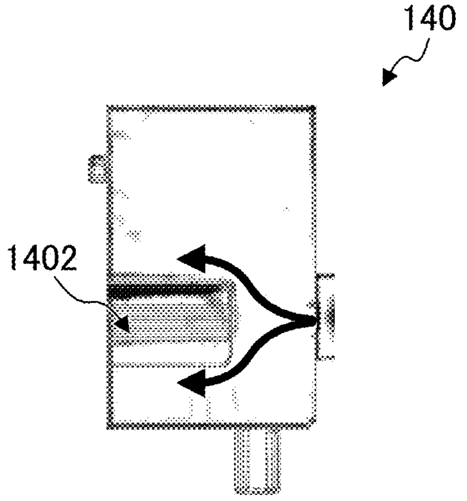
FIGS. 9D to 9F show a simulation result of positions where weld lines can be formed in manufacture of the second optical receptacle according to the embodiment by injection molding.
Figure 9B:
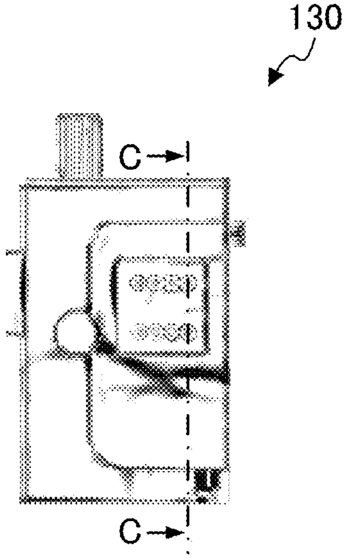
Figure 9E:
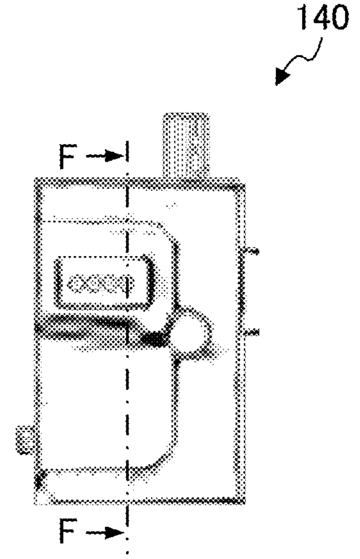
Figure 9C:
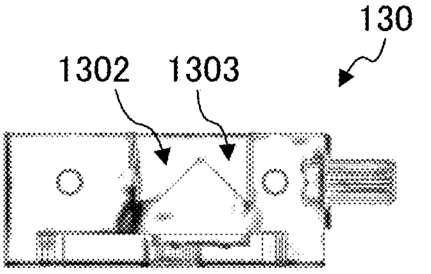
Figure 9F:
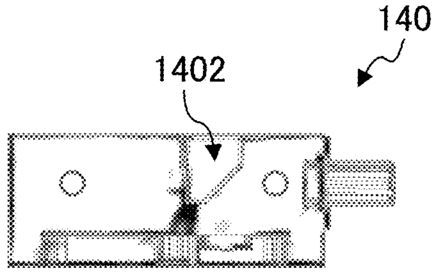

FIGS. 9A to 9C show a simulation result of positions where weld lines can be formed in manufacture of first optical receptacle 130 by injection molding, and FIGS. 9D to 9F show a simulation result of positions where weld lines can be formed in manufacture of second optical receptacle 140 by injection molding. FIG. 9A shows a simulation result with first optical receptacle 130 in plan view, FIG. 9B shows a simulation result with first optical receptacle 130 in bottom view, and FIG. 9C shows a simulation result with first optical receptacle 130 in cross section taken along line C-C of FIG. 9B. In addition, FIG. 9D shows a simulation result with second optical receptacle 140 in plan view, FIG. 9E shows a simulation result with second optical receptacle 140 in bottom view, and FIG. 9F shows a simulation result with second optical receptacle 140 in cross section taken along line F-F of FIG. 9E.

It is to be noted that, in FIG. 8D and FIGS. 9A and 9D, the arrow direction indicates the flow direction of resin in the cavity in manufacture of the optical receptacles, and the blacked out portion indicates generation of weld line.

As illustrated in FIG. 8F, in comparative optical receptacle 120', a weld line was generated in the region of a light path between second recess 1302' (first reflection surface 132') and third recess 1303' (light separation part 133'). One possible reason for this may be that when the molten resin injected into the cavity of the metal mold is divided to turn around fifth recess 1402', and the divided molten resin is further divided to turn around second recess 1302' and third recess 1303', the divided molten resins join together in the region of the light path between first recess 1302' (first reflection surface 132') and second recess 1303' (light separation part 133') (see the arrow in FIG. 8D).

In contrast, as illustrated in FIG. 9C, in first optical receptacle 130, no weld line was generated in the region of the light path between second recess 1302 (first reflection surface 132) and third recess 1303 (light separation part 133). One possible reason for this may be that although the molten resin injected into the cavity of the metal mold is divided to turn around second recess 1302 and third recess 1303, the divided molten resins flow into the cavity without joining together (see the arrow in FIG. 9A).

Also, in second optical receptacle 140, no weld line was generated in the region of the light path near fifth recess 1402 (second reflection surface 132) as illustrated in FIG. 9F. One possible reason for this may be that although the molten resin injected into the cavity of the metal mold is divided to turn around fifth recess 1402, the divided molten resins flow into the cavity without joining together (see the arrow in FIG. 9D).

Effect

As described above, optical receptacle 120 according to the present embodiment includes first optical receptacle 130 for transmission and second optical receptacle 140 for reception that are coupled with each other through a fitting structure (first fitting part 137 and second fitting part 144). First optical receptacle 130 and second optical receptacle 140 may be manufactured as separated members. With this configuration, it is possible to prevent the divided molten resin from joining together in the region of the light paths of the optical receptacle in manufacture by injection molding, and as a result, it is possible to prevent generation of a weld line in the region of the light paths of the optical receptacle. Accordingly, optical receptacle 120 according to the present embodiment can optically couple light-emitting element 112 and light-receiving element 114 to the end surfaces of optical transmission members 150 in an appropriate manner.

In addition, by using unified fitting structures (first fitting part 137 and second fitting part 144), it is possible to readily change the combination of first optical receptacle 130 and second optical receptacle 140 that are different in optical design.

Optical receptacle 120 according to the present embodiment includes a plurality of members, first optical receptacle 130 for transmission and second optical receptacle 140 for reception, and as such the number of components of optical receptacle 120 is larger than that of a conventional optical receptacle composed of a single member. However, with optical receptacle 120, it is possible to prevent generation of a weld line by separately manufacturing first optical receptacle 130 and second optical receptacle 140, and thus the degrees of freedom in design of optical receptacle 120 increase.

Further, a reflection film composed of a thin film of a metal having a high light reflectance (such as Al, Ag and Au) may be formed on first reflection surface 132, divided reflection surface 133*a* and second reflection surface 142. In the case where reduction of the number of components is desired to be prioritized, it is preferable to employ a configuration in which only a total reflection surface is utilized.

Figure 10A:
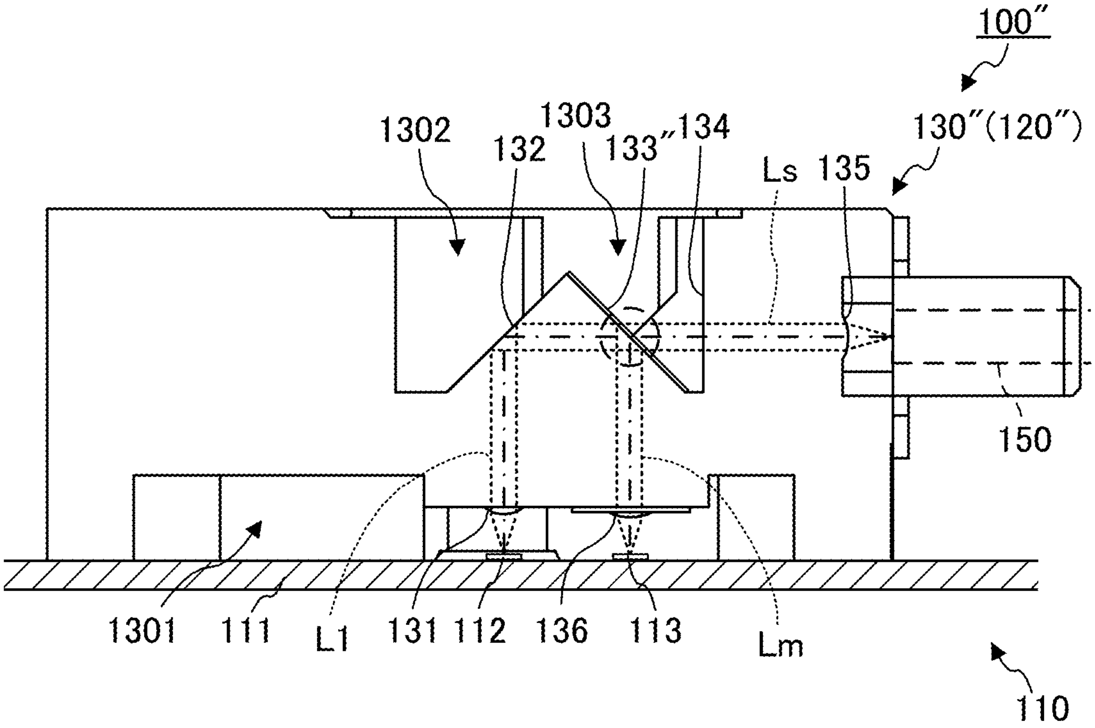
FIGS. 10A and 10B schematically illustrate a configuration of an optical module according to a modification of the embodiment.
Figure 10B:
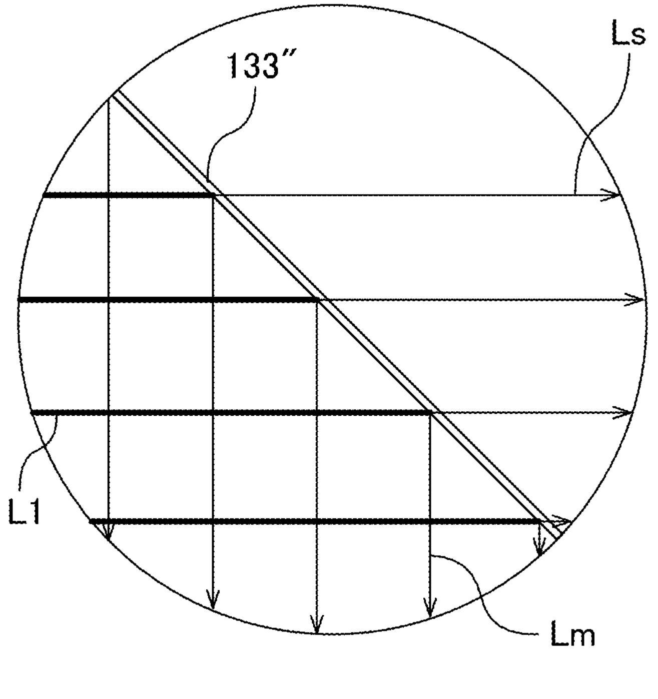

In addition, the optical receptacle according to the present invention is not limited to optical receptacle 120 according to the embodiment in which light separation part 133 includes a plurality of divided reflection surfaces 133*a*, a plurality of divided transmission surfaces 133*b*, and a plurality of divided step surfaces 133*c*. For example, the optical receptacle may be optical receptacle 120" according to a modification described below. FIGS. 10A and 10B schematically illustrate a configuration of optical module 100" according to a modification of the embodiment. FIG. 10A is a sectional view for describing a configuration of optical module 100" according to the modification, and FIG. 10B is a partially enlarged sectional view of a region indicated with the broken line in FIG. 10A, which illustrates light paths of first optical receptacle 130" in a region around light separation part 133". Optical module 100" according to the modification is different from optical module 100 according to the embodiment only in light separation part 133" of first optical receptacle 130" in optical receptacle 120".

As illustrated in FIG. 10A and FIG. 10B, in first optical receptacle 130" according to the modification, a light separation film (light separation part 133") is disposed in a part of the inner surface of third recess 1303. The light separation film separates first emission light L1 into monitor light Lm travelling toward detection device 113 and signal light Ls travelling toward the end surface of optical transmission member 150. The light separation film reflects a part of incident light, and allows the remaining part of the incident light to pass therethrough. As long as this function can be ensured, the light separation film may be, but not limited to, a thin film of the above-mentioned metal (such as Al Ag, and Au) for example. In addition, the light quantity ratio of signal light Ls and monitor light Lm can be adjusted by changing the transmittance of the light separation film.

In first optical receptacle 130" that functions as a transmitting optical module, a part of first emission light L1 reaching light separation part 133" is reflected by the light separation film toward third optical surface 136 and becomes monitor light Lm, and another part (remaining part) of first emission light L1 passes through the light separation film while being emitted out of first optical receptacle 130", and becomes signal light Ls.

This application is entitled to and claims the benefit of Japanese Patent Application No. 2016-043297 filed on Mar. 7, 2016, the disclosure each of which including the specification, drawings and abstract is incorporated herein by reference in its entirety.

INDUSTRIAL APPLICABILITY

The optical receptacle and the optical module according to the embodiment of the present invention are suitable for optical communications using an optical transmission member, for example.

REFERENCE SIGNS LIST

10 Optical module
20 Photoelectric conversion device
21 Light-emitting element
22 Detection device
30, 30' Optical receptacle
301' Transmitting portion
302' Receiving portion
31 First optical surface
32 Reflection surface
33 Light separation part
34 Transmission surface
35 Second optical surface
36 Third optical surface
37, 37' First recess
38, 38' Second recess
39' Third recess
40 Optical transmission member
L Emission light
100, 100" Optical module
110 Photoelectric conversion device
111 Substrate
112 Light-emitting element
113 Detection device
114 Light-receiving element
120, 120', 120" Optical receptacle
130, 130" First optical receptacle
1301 First recess
1302, 1302' Second recess
1303, 1303' Third recess
1304 First side surface
131 First optical surface
132, 132' First reflection surface
133, 133', 133" Light separation part
**133*a*** Divided reflection surface
**133*b*** Divided transmission surface
**133*c*** Divided step surface
134 Transmission surface
135 Second optical surface
136 Third optical surface
137 First fitting part
140 Second optical receptacle
1401 Fourth recess
1402, 1402' Fifth recess
1403 Second side surface
141 Fourth optical surface
142 Second reflection surface
143 Fifth optical surface
144 Second fitting part
150 Optical transmission member
L1 First emission light
L2 Second emission light
Ls Signal light
Lm Monitor light

The invention claimed is:

1. An optical receptacle configured to be disposed between a photoelectric conversion device and a plurality of optical transmission members, the photoelectric conversion device including a light-emitting element, a light-receiving element and a detection device for monitoring emission light emitted from the light-emitting element which are disposed on a substrate, the optical receptacle being configured to optically couple the light-emitting element and the light-receiving element to respective end surfaces of the plurality of optical transmission members, the optical receptacle comprising:

a first optical receptacle for transmission including a first surface, a second surface opposite to the substrate, a third surface opposite to the second surface and a first fitting part disposed on the first surface, the first optical receptacle being disposed on the substrate in such a manner that the first optical receptacle is directly opposite to the light-emitting element and the detection device; and a second optical receptacle for reception including a fourth surface, a fifth surface opposite to the substrate, a sixth surface opposite to the fifth surface and a second fitting part disposed on the fourth surface, the second fitting part being configured to be fit to the first fitting part, the second optical receptacle being disposed on the substrate in such a manner that the second optical receptacle is directly opposite to the light-receiving element, wherein the first optical receptacle includes a first recess and a second recess opening outward, the first recess and the second recess being formed in the third surface;

wherein the second optical receptacle includes a third recess opening outward, the third recess being formed in the sixth surface; and wherein a part of an inner surface of each of the first recess, the second recess and the third recess is a reflection surface.

2. The optical receptacle according to claim 1, wherein the first optical receptacle and the second optical receptacle are formed of a resin composition; and wherein base resins of the first optical receptacle and the second optical receptacle are identical to each other.

3. The optical receptacle according to claim 1, wherein the first optical receptacle includes:

a first optical surface configured to allow incidence of first emission light emitted from the light-emitting element, a second optical surface configured to emit signal light toward the end surfaces of the plurality of optical transmission members, the signal light being a part of the first emission light which has entered the first optical receptacle from the first optical surface and has passed through an inside of the first optical receptacle, a first reflection surface that is a part of the inner surface of the first recess, the first reflection surface being configured to reflect, toward the second optical surface, the first emission light incident on the first optical surface, a light separation part that is a part of the inner surface of the second recess, the light separation part being configured to separate the first emission light incident on the first optical surface into monitor light travelling toward the detection device and the signal light travelling toward the end surfaces of the plurality of optical transmission members, and a third optical surface configured to emit, toward the detection device, the monitor light separated by the light separation part; and wherein the light separation part internally reflects, toward the third optical surface, a part of the first emission light as the monitor light, and allows, to pass through the light separation part toward the second optical surface side, another part of the first emission light as the signal light.

4. The optical receptacle according to claim 3, wherein the light separation part includes:

a plurality of divided reflection surfaces inclined to an optical axis of the first emission light, and a plurality of divided transmission surfaces perpendicular to the optical axis of the first emission light, wherein the plurality of divided reflection surfaces and the plurality of divided transmission surfaces are alternately disposed along an inclination direction of the plurality of divided reflection surfaces;

wherein the plurality of divided reflection surfaces internally reflect, toward the third optical surface, a part of the first emission light as the monitor light; and wherein the plurality of divided transmission surfaces allow, to pass through the plurality of divided transmission surfaces toward the second optical surface side, another part of the first emission light as the signal light.

5. The optical receptacle according to claim 1, wherein the second optical receptacle includes:

a fourth optical surface configured to allow incidence of second emission light emitted from the end surfaces of the plurality of optical transmission members;

a fifth optical surface configured to emit, toward the light-receiving element, the second emission light which has entered the second optical receptacle from the fourth optical surface and has passed through an inside of the second optical receptacle; and a second reflection surface that is a part of the inner surface of the third recess, the second reflection surface being configured to reflect, toward the fifth optical surface, the second emission light incident on the fourth optical surface.

6. An optical module comprising:

a photoelectric conversion device including a substrate, a light-emitting element disposed on the substrate, a light-receiving element disposed on the substrate, and a detection device disposed on the substrate, the detection device being configured to monitor emission light emitted from the light-emitting element; and the optical receptacle according to claim 1, wherein the first optical receptacle is disposed on the substrate in such a manner that the first optical receptacle is directly opposite to the light-emitting element and the detection device, wherein the second optical receptacle is disposed on the substrate in such a manner that the second optical receptacle is directly opposite to the light-receiving element, and wherein the first optical receptacle and the second optical receptacle are coupled with each other by fitting the first fitting part and the second fitting part to each other.

* * * * *